(12) United States Patent
Tsugimura

(10) Patent No.: US 9,014,468 B2
(45) Date of Patent: Apr. 21, 2015

(54) IMAGE PROCESSING APPARATUS, COMPUTER-READABLE STORAGE MEDIUM STORING COMPUTER-READABLE INSTRUCTIONS AND ASSOCIATED METHOD

(71) Applicant: Koichi Tsugimura, Nagoya (JP)

(72) Inventor: Koichi Tsugimura, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 119 days.

(21) Appl. No.: 13/838,912

(22) Filed: Mar. 15, 2013

(65) Prior Publication Data
US 2013/0259366 A1    Oct. 3, 2013

(30) Foreign Application Priority Data
Mar. 30, 2012    (JP) .................................. 2012-080288

(51) Int. Cl.
| | | |
|---|---|---|
| G06K 9/00 | (2006.01) | |
| G06K 9/46 | (2006.01) | |
| H04N 1/40 | (2006.01) | |
| H04N 1/56 | (2006.01) | |
| H04N 1/62 | (2006.01) | |

(52) U.S. Cl.
CPC .......... G06K 9/4652 (2013.01); H04N 1/40062 (2013.01); H04N 1/56 (2013.01); H04N 1/62 (2013.01)

(58) Field of Classification Search
CPC .......... H04N 1/56; G06T 2207/10008; G06T 2207/10024; G06T 2207/20008; G06T 2207/30176; G06K 9/4652; G06K 15/02

USPC ................ 382/162, 164, 166, 165, 167, 274; 358/538, 539, 452, 1.9, 2.1
See application file for complete search history.

(56) References Cited

U.S. PATENT DOCUMENTS

| | | | |
|---|---|---|---|
| 6,757,427 B1 | 6/2004 | Hongu | |
| 2004/0071362 A1* | 4/2004 | Curry et al. | .................... 382/274 |
| 2004/0257622 A1* | 12/2004 | Shibaki et al. | .................. 358/2.1 |
| 2005/0180645 A1 | 8/2005 | Hasegawa et al. | |
| 2010/0296110 A1* | 11/2010 | Liu | ................................ 358/1.9 |

FOREIGN PATENT DOCUMENTS

| | | | |
|---|---|---|---|
| JP | 3104380 A | 5/1991 | |
| JP | 5225378 A | 9/1993 | |
| JP | 2001-061062 A | 3/2001 | |
| JP | 2003-046746 A | 2/2003 | |
| JP | 2004-362541 A | 12/2004 | |
| JP | 2005-012768 A | 1/2005 | |
| JP | 2006-093880 A | 4/2006 | |

* cited by examiner

*Primary Examiner* — Ali Bayat
(74) *Attorney, Agent, or Firm* — Scully, Scott, Murphy & Presser, P.C.

(57) ABSTRACT

An image processing apparatus may create text image data representing a text image, based on target image data representing a target image including text. The image processing apparatus may determine an extended text area in the target image based on information related to a sharpness of the text included in the target image. The extended text area may include a text area corresponding to pixels constituting text in the text image represented by the created text image data, and also include a surrounding area around the text area. The image processing apparatus may change a color of the extended text area to a color of a background of the target image to create background image data.

23 Claims, 12 Drawing Sheets

Fig.3A
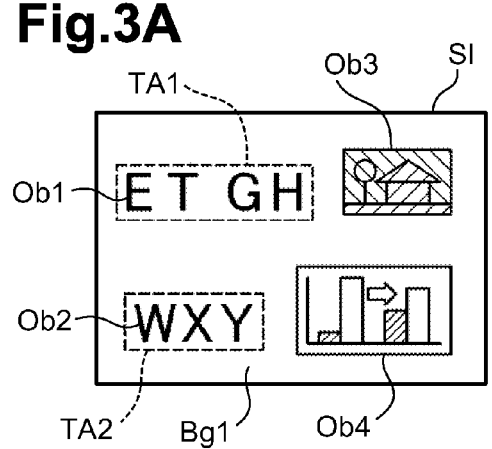
Fig.3B
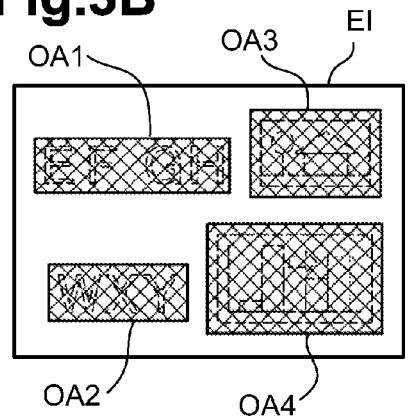
Fig.3C
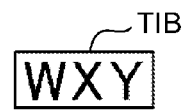
Fig.3D
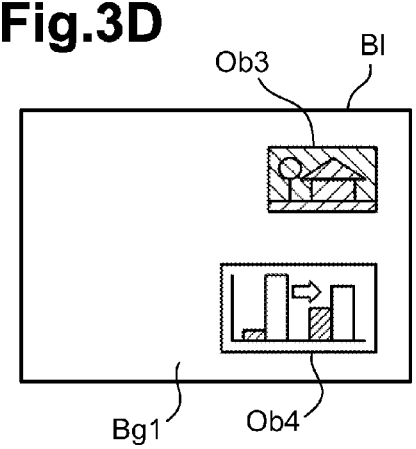

Fig.6A
| INDEX VALUE SL | EXPANSION LEVEL |
|---|---|
| 0 < SL ≤ TH1 | 0 |
| TH1 < SL ≤ TH2 | 1 |
| TH2 < SL ≤ TH3 | 2 |
| TH3 < SL ≤ TH4 | 3 |
| TH4 < SL | 4 |
Fig.6B
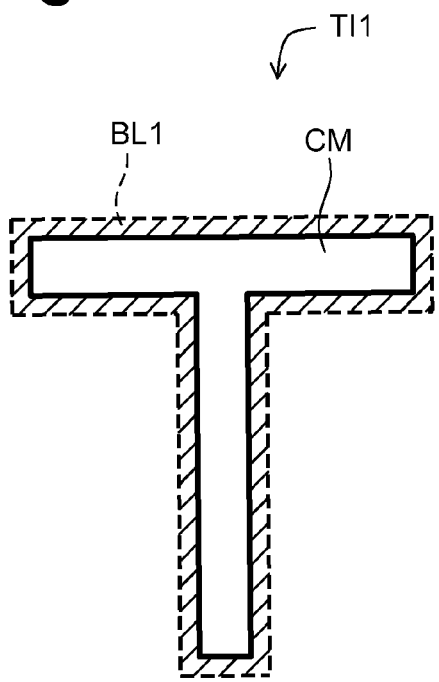
Fig.6C
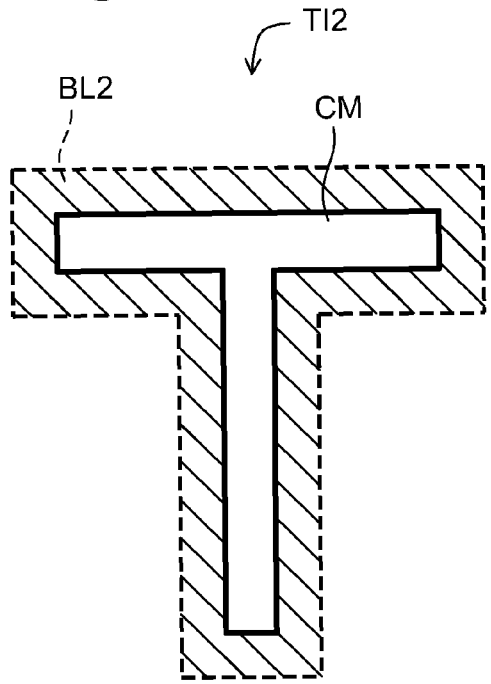

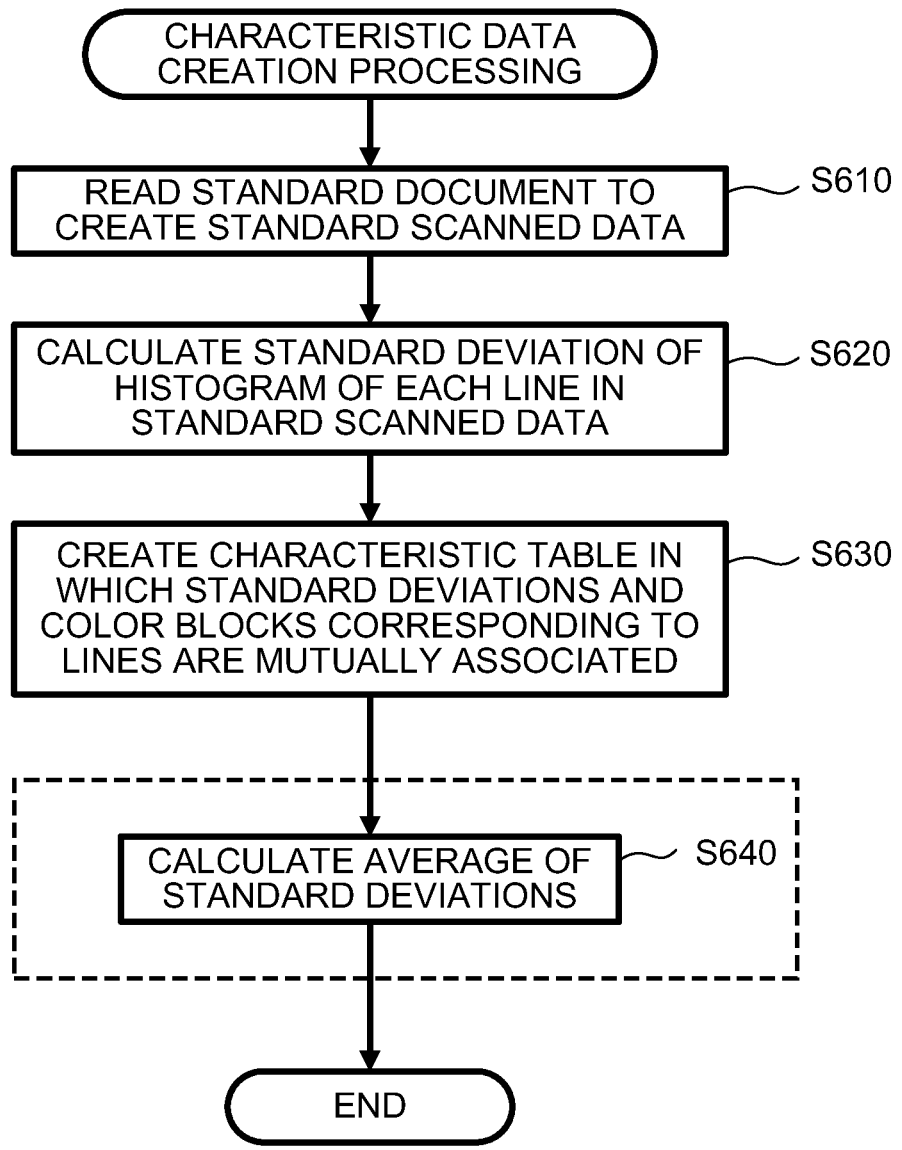

IMAGE PROCESSING APPARATUS, COMPUTER-READABLE STORAGE MEDIUM STORING COMPUTER-READABLE INSTRUCTIONS AND ASSOCIATED METHOD

CROSS-REFERENCE TO RELATED APPLICATION

This application claims priority from Japanese Patent Application No. 2012-080288, filed on Mar. 30, 2012, which is incorporated herein by reference.

TECHNICAL FIELD

The present invention relates to image processing, and more particularly to a technology that creates text image data and background image data from target image data.

BACKGROUND

A known technology separately creates text image data representing text and background image data not including text, from target image data representing a target image including text. In this technology, the text image data (i.e. binary data) representing text is created with first pixels constituting text and second pixels not constituting text. In order to create the background image data, a plurality of pixels of the target image which correspond to a plurality of first pixels in the binary data are changed to the average color of a plurality of pixels corresponding to a plurality of second pixels in the binary data. The separated text image data is compressed by a compression method suitable to compression of text image data (e.g. Modified Modified Read (MMR) method), and the separated background image data is compressed by a compression method suitable to compression of background image data (e.g. Joint Photographic Experts Group (JPEG) method). As a result, the entire target image data can be compressed with a high compression ratio.

SUMMARY

According to one or more aspects of the disclosure, an image processing apparatus may comprise: a controller configured to: create text image data representing a text image, based on target image data representing a target image including text; determine an extended text area in the target image based on information related to a sharpness of the text included in the target image, the extended text area including a text area corresponding to pixels constituting text in the text image represented by the created text image data, and also including a surrounding area around the text area; and change a color of the extended text area to a color of a background of the target image to create background image data.

According to one or more aspects of the disclosure, a computer-readable storage medium may store computer-readable instructions. The computer-readable instructions, when executed, cause a processor to perform: creating text image data representing a text image, based on target image data representing a target image including text; determining an extended text area in the target image based on information related to a sharpness of the text included in the target image, the extended text area including a text area corresponding to pixels constituting text in the text image represented by the created text image data, and also including a surrounding area around the text area; and changing a color of the extended text area to a color of a background of the target image to create background image data.

A method comprising: creating text image data representing a text image, based on target image data representing a target image including text; determining an extended text area in the target image based on information related to a sharpness of the text included in the target image, the extended text area including a text area corresponding to pixels constituting text in the text image represented by the created text image data, and also including a surrounding area around the text area; and changing a color of the extended text area to a color of a background of the target image to create background image data.

Other objects, features, and advantages will be apparent to persons of ordinary skill in the art from the following detailed description of the disclosure and the accompanying drawings.

BRIEF DESCRIPTION OF THE DRAWINGS

FIGS. 3A to 3D illustrate examples of images used in image processing.

FIGS. 6A to 6C are diagrams for explaining an expansion level of a character.

FIG. 11 is a flowchart of characteristic data creation processing executed to create the characteristic data.

DETAILED DESCRIPTION OF EMBODIMENT

Figure 1:
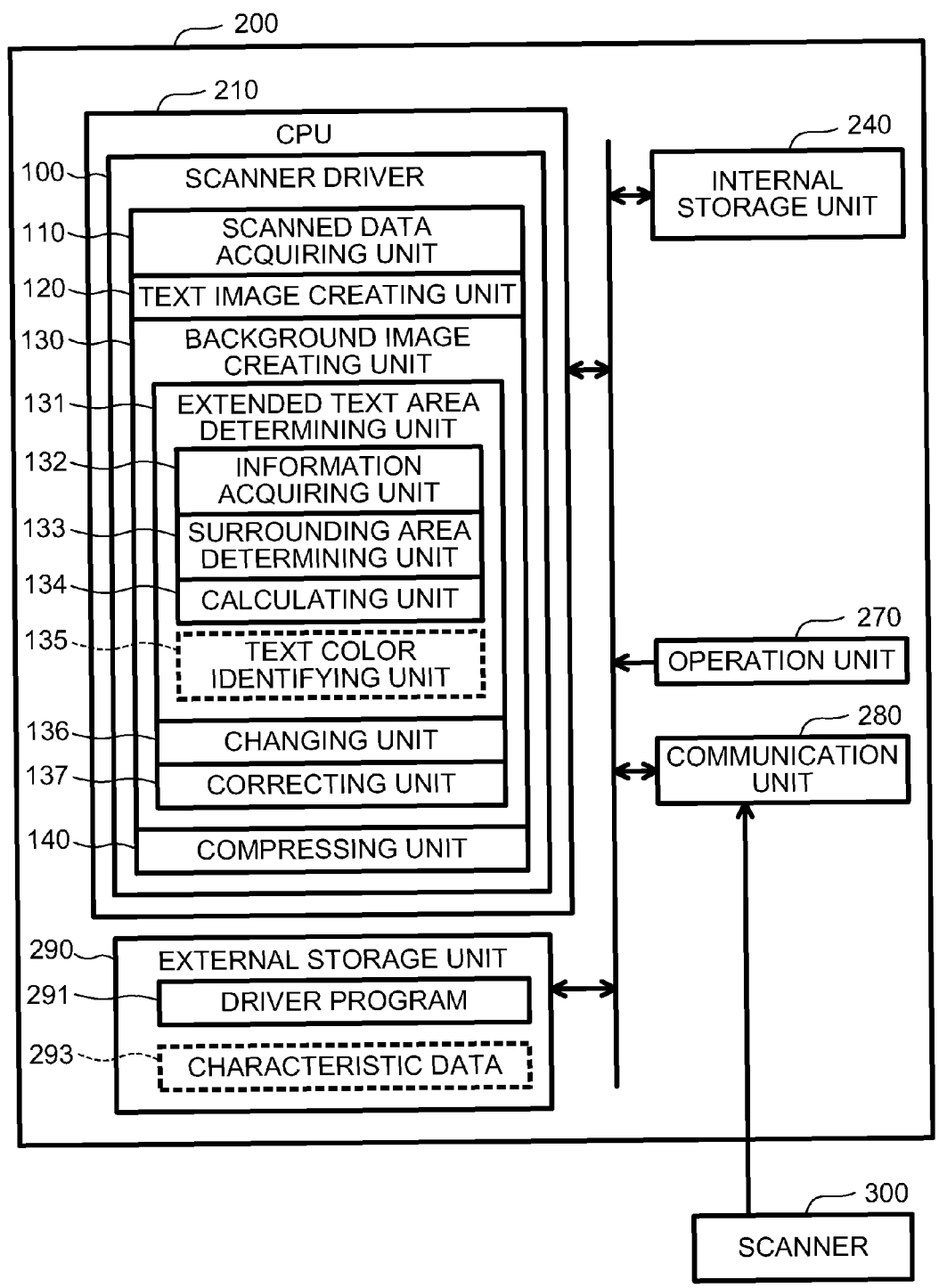
FIG. 1 is a block diagram illustrating structure of a computer, which is an example of an image processing apparatus.

A. First Embodiment (A-1. Structure of Image Processing Apparatus) An embodiment of the present invention will be described using examples. FIG. 1 is a block diagram illustrating structure of a computer 200, which is an example of an image processing apparatus in a first embodiment.

The computer 200 is, for example, a personal computer. The computer 200 comprises a central processing unit (CPU) 210, an internal storage unit 240 including a read-only memory (ROM) and a random-access memory (RAM), an operation unit 270 including a mouse and a keyboard, a communication unit 280 used to communicate with an external unit, and an external storage unit 290 such as a hard disk drive.

The computer 200 is connected through the communication unit 280 to an external device such as a scanner 300 so that communication with the external device is possible. The scanner 300 is an image reading unit that optically reads an original document and obtains scanned data.

The internal storage unit 240 has a buffer area that temporarily stores various types of intermediate data created during processing executed by the CPU 210. The external storage unit 290 stores a driver program 291. The driver program 291 is provided in the form of a compact disc read only memory (CD-ROM), for example.

The CPU 210 executes the driver program 291 and thus functions as a scanner driver 100. The scanner driver 100 comprises a scanned data acquiring unit 110, a text image creating unit 120, a background image creating unit 130, and a compressing unit 140. The background image creating unit 130 comprises an extended text area determining unit 131, a changing unit 136, and a correcting unit 137. The extended text area determining unit 131 comprises an information acquiring unit 132, a surrounding area determining unit 133, and a calculating unit 134.

The scanned data acquiring unit 110 acquires scanned data as target image data that represents a target image including text. The text image creating unit 120 creates text image data (e.g. binary data) representing a text image, with use of the acquired scanned data. The background image creating unit 130 creates background image data with used of the acquired scanned data. The background image data represents a background image in which text has been deleted by changing a color of the text image of the scanned image to background color. The compressing unit 140 compresses the text image data and background image data differently by different compression methods. The compressed text image data and compressed background image data are each stored in a single portable document file (PDF). As a result, a compressed image file in which scanned data is compressed is generated.

Figure 2:
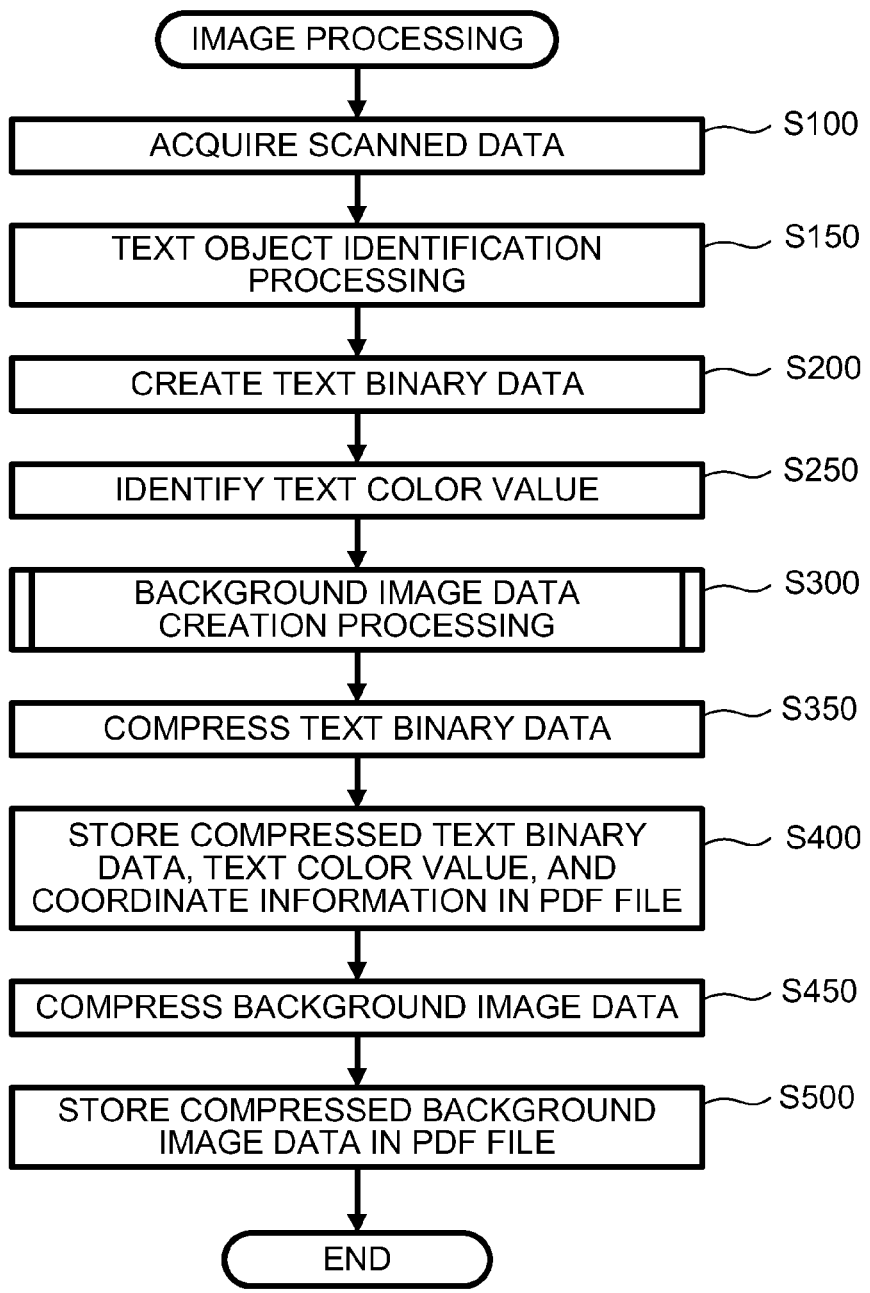
FIG. 2 is a flowchart of image processing.

(A-2. Image Processing) FIG. 2 is a flowchart of image processing. The image processing is executed by the scanner driver 100 when, for example, a user places an original document on the scanner 300 and instructs the scanner driver 100 to read the original document to create scanned data. In step S100, the scanned data acquiring unit 110 acquires scanned data to be processed. Specifically, the scanned data acquiring unit 110 controls an image reading unit in the scanner 300 to read the original document prepared by the user in order to acquired scanned data. The scanned data is RGB image data formed with a plurality of pixel data each including component values of three colors, red (R), green (G) and blue (B) (each component value in this embodiment represents one of 256 tone values).

FIGS. 3A to 3D illustrate examples of images used in image processing. FIG. 3A illustrates an example of a scanned image SI represented by scanned data. The scanned image SI includes a background Bg1, text objects Ob1 and Ob2 representing text, a photo object Ob3 representing a photo, and a drawing object Ob4 representing a drawing. The drawing object represents, for example, an illustration, a table, a diagram, or a pattern.

In step S150 of FIG. 2, the text image creating unit 120 executes text object identification processing by which a text object area including the text objects is identified in the scanned image SI. Specifically, the text image creating unit 120 applies an edge detection filter such as a sobel filter to the scanned data so as to create edge image data representing an edge image EI (see FIG. 3B). In the edge image EI, the text image creating unit 120 identifies an area having an edge strength larger than a reference value, and identifies an area, in the scanned image SI, that corresponds to the identified area. In the example in FIG. 3B, four areas OA1 to OA4 corresponding to the four objects Ob1 to Ob4 in the scanned image SI are identified in the edge image EI.

The text image creating unit 120 determines whether each object area in the scan image SI is a text object area based on color distribution of the object area. Specifically, the text image creating unit 120 uses a histogram of the brightness of the object area to calculate the number C of types of brightness values included in the object area. The text image creating unit 120 classifies a plurality of pixels included in the object area into background pixels and object pixels other than the background pixels. Each of the background pixels has a color close to a color (i.e. background color) of an area around the object area. Then the text image creating unit 120 calculates a ratio D of the object pixels, which is a ratio of the number of object pixels to the number of background pixels (i.e. number of object pixels/number of background pixels). The text objects tend to have a smaller number C of types of brightness values (smaller number of color types) than non-text objects. Also the text objects tend to have a smaller ratio D of the object pixels than non-text objects. When the number C of types of brightness values (the number of color types) of a target object area is smaller than a first threshold and the ratio D of the object pixels of the target object area is smaller than a second threshold, text image creating unit 120 determines that the target object area is a text object area. In the example in FIG. 3A, text object areas TA1 and TA2 corresponding to the text object Ob1 and Ob2 are identified in the scan image SI.

In step S200 in FIG. 2, the text image creating unit 120 creates text binary data of the identified text object area. Specifically, the text image creating unit 120 extracts partial image data representing a text object area from the scanned data, and executes binarization processing on the extracted partial image data. More specifically, the text image creating unit 120 calculates a RGB value (BR, BG, GB) that represents a color of an area around the text object area (i.e. a color of the ground Bg1). Next, in order to create the text binary data, if the component value (Ri, Gi, Bi) of pixel i that is part of the text object area satisfies all of equations (1) to (3) below, the text image creating unit 120 assigns "0" to the pixel value of the text binary data corresponding to pixel i. If any of equations (1) to (3) is not satisfied, the text image creating unit 120 assigns "1" to the pixel value.

$$BR-\Delta V < Ri < BR+\Delta V \quad (1)$$

$$BG-\Delta V < Gi < BG+\Delta V \quad (2)$$

$$BB-\Delta V < Bi < BB+\Delta V \quad (3)$$

A pixel having a pixel value of "1" in the text binary data is a text pixel constituting text. A pixel having a pixel value of 0 is a non-text pixel not constituting text. As seen from equations (1) to (3) above, if the color of pixel i is substantially the same as the color of the area around the text object area (if the difference in these color values is smaller than $\Delta V$), pixel i is classified as a text pixel. If the color of pixel i differs from the color of the area around the text object area (if the difference in these color values is larger than or equal to $\Delta V$), pixel i is classified as a non-text pixel. FIG. 3C illustrates binary images TIA and TIB represented by text binary data corresponding to the text object area TA1 and TA2 in the scanned image SI.

In step S250 in FIG. 2, the text image creating unit 120 identifies a text color value (RGB value) that represents a color of text in the text object area. Specifically, in the object area in the scanned image SI, the text image creating unit 120 identifies a text area corresponding to a plurality of text pixels that constitute text in the text binary data. The text image creating unit 120 identifies an average of pixel values (i.e. color values) in the text area as the text color value.

In step S300, the background image creating unit 130 executes background image data creation processing. In the background image data creation processing, background image data representing a background image BI from which text has been deleted is created. FIG. 3D illustrates the background image BI in which text object Ob1 and Ob2, which had been present in the scanned image SI illustrated in FIG. 3A, has been deleted and only the photo object Ob3 and drawing object Ob4 remain. The background image data creation processing will be described later in detail.

In step S350, the compressing unit 140 compresses the text binary data created in step S200 so as to create compressed text binary data. When the resolution of a text image represented by text binary data is reduced, edges noticeably become ragged, making the visibility of the text image tend to lower. The compressing unit 140 uses the Modified Modified Read (MMR) method (also referred to as the CCITT-G4 method), which is a lossless compression method by which binary image data can be compressed with a high compression ratio without the resolution being reduced, so as to create compressed text binary data. In the examples in FIGS. 3A to 3D, two text binary data that represent the binary images TIA and TIB illustrated in FIG. 3C are compressed and two compressed text binary data are created.

In step S400, the scanner driver 100 stores the compressed text binary data, the text color value, and coordinate information in a PDF file in relation to one another. The coordinate information represents a position, in the scanned image SI, of the text binary image represented by the compressed text binary data.

In step S450, the compressing unit 140 compresses the background image data created in step S300 to create compressed background image data. The background image BI (see FIG. 3D) represented by the background image data does not include text and is a multi-tone (256-tone) image that can include a photo and a drawing. The compressing unit 140 uses the Joint Photographic Experts Group (JPEG) method, which is suitable to the compression of this type of multi-tone image, to compress the background image data.

In JPEG compression, the compressing unit 140 converts RGB pixel data, which constitutes the background image data, to YCrCb pixel data. The compressing unit 140 divides the background image BI represented by the background image data into blocks, each of which is formed with eight vertical pixels by eight horizontal pixels, and performs a two-dimensional discrete cosine transform for each block to obtain DCT coefficients, which represent frequency components of eight vertical frequency components by eight horizontal frequency components. Furthermore, the compressing unit 140 divides the DCT coefficient of each block by a quantization threshold stipulated in a quantization table (not shown) to obtain a quantization coefficient for each block. The compressing unit 140 arranges the obtained quantization coefficients in a prescribed scanning order and performs Huffman coding on these quantization coefficients to compress the background image data. As seen from the above description, the higher the evenness of image data to be compressed by the JPEG method is, that is, the smaller each frequency component is, the more quantization coefficients become zero, so the compression ratio is increased.

In step S500, the scanner driver 100 stores the compressed background image data in the PDF file in which the compressed text binary data, the text color value and coordinate information have been stored in step S400, and terminate the image processing. Image data items in a plurality of different formats can be stored in a single PDF file. When image data stored in the PDF file is displayed, a plurality of stored image data can be superimposed so that the plurality of image data can be reproduced as a single image. In step S400, the compressed text binary data, text color value, and coordinate information are stored in a PDF file, and in step S500, the compressed background image data is stored in the PDF file. As a result, highly compressed PDF data representing the scanned image SI is created. Therefore the scanned image SI can be stored such that the text included in the scanned image SI is sharp and easy-to-read, and the scanned image SI can be stored in a format in which the amount of data is relatively small.

Figure 4:
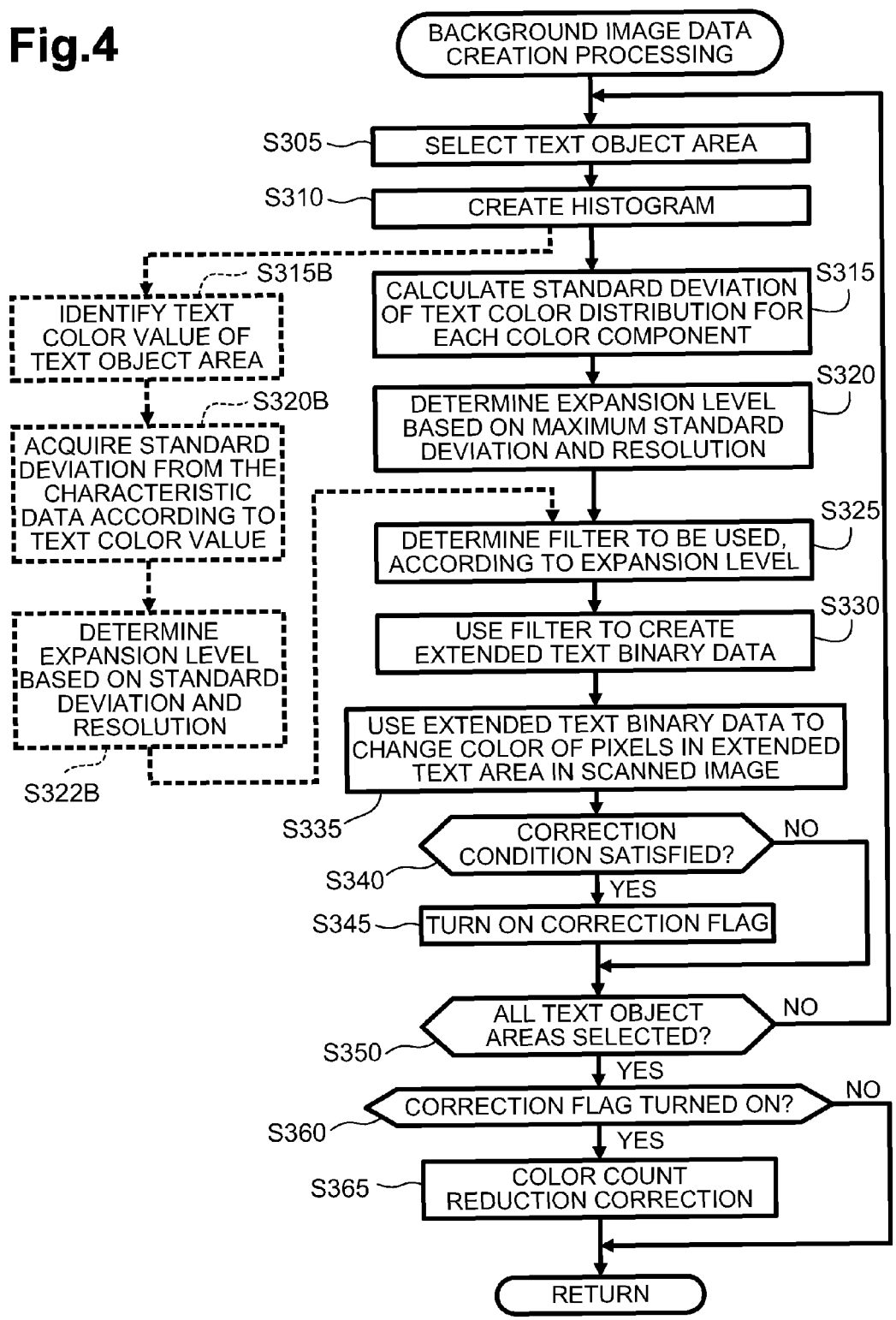
FIG. 4 is a flowchart of background image data creation processing.

(A-3. Background Image Data Creation Processing) FIG. 4 is a flowchart of background image data creation processing (S300 of FIG. 2). In step S305, the background image creating unit 130 selects one text object area in the scanned image SI. In the example of FIG. 3A, the two text object areas TA1 and TA2 identified in the scanned image SI are selected one at a time to process the selected text object area.

Figure 5:
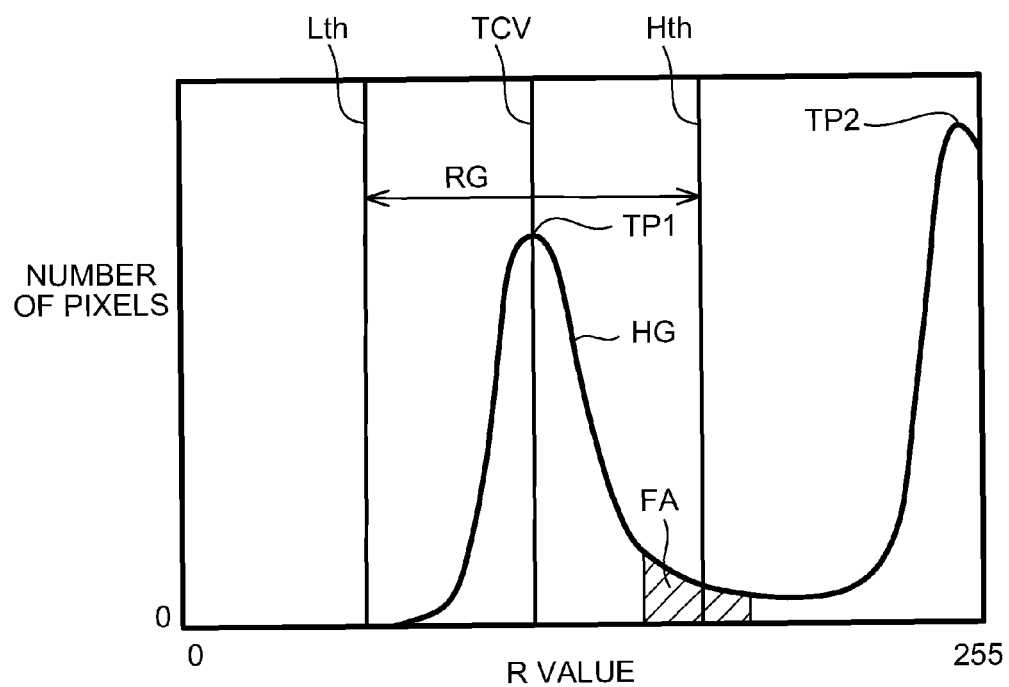
FIG. 5 is an example of a histogram of a text object area.

In step S310, the calculating unit 134 creates color distribution data (e.g. histogram) of the selected text object area for each of the three color components, R, G and B. FIG. 5 is an example of the histogram of a text object area. The histogram HG in FIG. 5 plots tone values (R values) of the R component on the horizontal axis and the number of pixels, each of which has a corresponding tone value, on the vertical axis.

In step S315, the calculating unit 134 calculates the standard deviation of the text color distribution for each color component. The R component in FIG. 5 will be taken as an example. As illustrated in FIG. 5, the histogram HG of the text object area has a peak TP1 corresponding to the text and a peak TP2 corresponding to the background. The calculating unit 134 calculates an average of R values in a text area (i.e. area corresponding to the text pixels constituting text in the text binary data) in the text object area. Of the two R values corresponding to the peaks TP1 and TP2, the calculating unit 134 identifies one R value which is closer to the calculated average. The identified R value is the mode value of the R values of the text pixels, so the identified R value will be referred to as the text central value TCV. The calculating unit 134 determines a predetermined range RG (also referred to as a text color distribution range) centered at the text central value TCV. The lower limit Lth of the text color distribution range is represented by an equation TCV−(RG/2), and the upper limit Hth of the text color distribution range is represented by an equation TCV+(RG/2) (see FIG. 5). The calculating unit 134 calculates the standard deviation σ of the R values of n pixels in the text color distribution range. The standard deviation σ is calculated by using equation (4) below. Rave in equation (4) is an average of the R values of n pixels in the text color distribution range RG.

$$\sigma = \sqrt{\frac{1}{n}\sum_{i=1}^{n}(Ri - \text{Rave})^2} \quad (4)$$

In step S320, the extended text area determining unit 131 determines an expansion level that represents an extent to which a character is expanded due to the blurred edges of the character. Specifically, the information acquiring unit 132 of the extended text area determining unit 131 acquires the maximum standard deviation σmax from the three standard deviations σ calculated for the three components R, G, and B. The information acquiring unit 132 multiplies the maximum standard deviation σmax by the resolution RS of the scanned data to calculate an index value SL related to the degree of a text blur (SL=σmax×RS). The resolution of the scanned data, the unit of which is dots per inch (dpi), is determined for, for example, each scanner 300. The scanner driver 100 recognizes the resolution in advance. If a resolution in a vertical direction and a resolution in a horizontal direction differ, an average of the two resolutions is used. The surrounding area determining unit 133 of the extended text area determining unit 131 determines the expansion level according to the index value SL.

FIGS. 6A to 6C are diagrams for explaining the expansion level of a character. The table in FIG. 6A illustrates a correspondence between the index value SL and the expansion level. In this embodiment, the expansion level is determined to be one of five levels "0" to "4" according to the result of comparison of the index value SL with four thresholds TH1 to TH4, as illustrated in FIG. 6A. Specifically, if the index value SL is smaller than or equal to the first threshold TH1, the expansion level is determined to be "0". If the index value SL is larger than the first threshold TH1 but smaller than or equal to the second threshold TH2, the expansion level is determined to be "1". If the index value SL is larger than the second threshold TH2 but smaller than or equal to the third threshold TH3, the expansion level is determined to be "2". If the index value SL is larger than the third threshold TH3 but smaller than or equal to the fourth threshold TH4, the expansion level is determined to be "3". If the index value SL is larger than the fourth threshold TH4, the expansion level is determined to be "4".

The technical meaning of the index value SL will be described below. FIGS. 6B and 6C conceptually illustrate an image of a character included in the scanned image SI. Specifically, FIGS. 6B and 6C each schematically illustrate a text image obtained by reading an original document including text represented in a single color. The letter "T" included in the text images TI1 included in the scanned image SI (see FIG. 6B) includes a core area CM having a color substantially the same as a color of the letter in the original document, and an edge area BL1, which encloses the core area CM, in the vicinity of boundary between the background and the letter. Similarly, the letter T included in the text images TI2 included in the scanned image SI (see FIG. 6C) includes a core area CM having a color substantially the same as a color of the letter in the original document and an edge area BL2, which encloses the core area CM, in the vicinity of boundary between the background and the letter. The edge areas BL1 and BL2 have an intermediate color between the color of the core area CM and the color of the background, and correspond to the bottom FA (hatched area) of the peak TP1, in the histogram HG of FIG. 5, which corresponds to the character.

FIG. 6B conceptually illustrates the edge area BL1 having a small degree of a text burr, and FIG. 6C conceptually illustrates the edge area BL2 having a large degree of a text burr. The larger the degree of the blur of the characters TI is, the more unclear (the thicker) the edges between the text and the background are, so the edge area BL2 become large (see FIG. 6C). Conversely, the smaller the degree of the blur of the characters TI is, the clearer (the thinner) the edges between the text and the background are, so the edge area BL1 become small (see FIG. 6B).

Figure 7A:
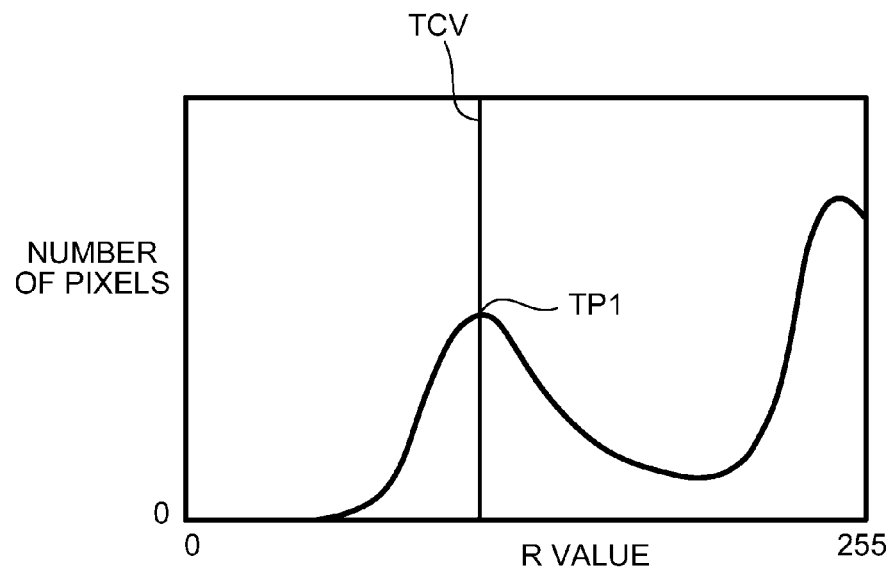
FIGS. 7A and 7B illustrate a relationship between a degree of text blur and a histogram.
Figure 7B:
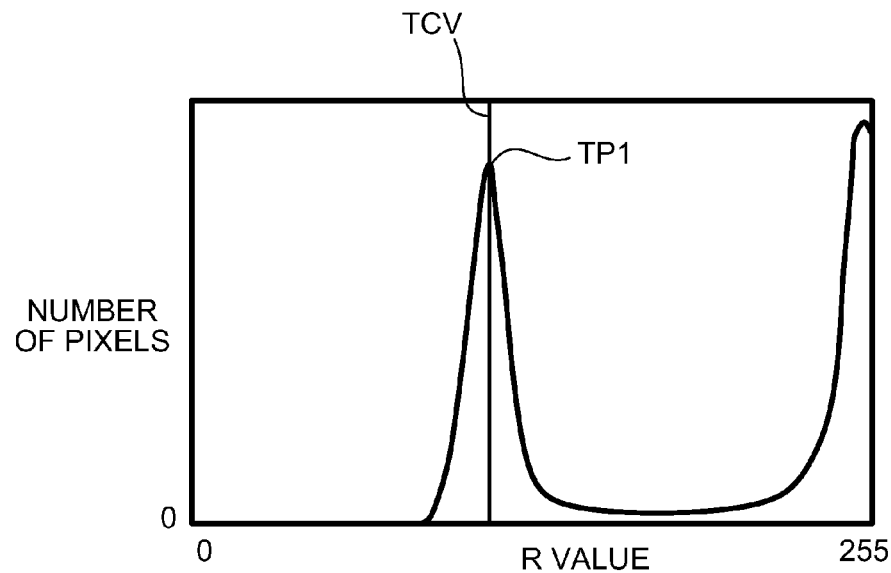

FIGS. 7A and 7B illustrate a relationship between a degree of text blur and a histogram. FIG. 7A illustrates a histogram of the R component in a case in which the degree of a text blur is relatively large, and FIG. 7B illustrates a histogram of the R component in a case in which the degree of a text blur is relatively small. When the degree of a text blur is relatively large, the spread of the histogram, which is represented by a dispersion or standard deviation, is relatively large. When the degree of a text blur is relatively small, the spread of the histogram is relatively small. Accordingly, the larger the maximum standard deviation σmax is, the larger the degree of a text blur is. The maximum standard deviation σmax could be said to be an index value that represents the degree of a text blur, that is, the degree of the size (width) of the edge areas (e.g. BL1 in FIG. 6B and BL2 in FIG. 6C). The more sharp the text is, the smaller the degree of a text blur is. The less sharp the text is, the larger the degree of a text blur is. Accordingly, the reciprocal TL of the maximum standard deviation σmax (i.e. TL=1/σmax) could be said to be an index value that represents the degree of the sharpness of the text.

The reason why the maximum standard deviation σmax is multiplied by the resolution RS in step S320 is to correct the size (width) of the edge area BL to a value with respect to the size of the pixel. The higher the resolution RS is, the smaller the size (width) of one pixel is. Therefore, the higher the resolution RS is, the larger the index value SL is. Where, the index value SL is obtained by multiplying the maximum standard deviation σmax by the resolution RS and thus represents the degree of the size of the edge area BL with respect to the size of the pixel. Specifically, the maximum standard deviation σmax corresponds to the width of the edge area. Since, however, the expansion level is a value that determines the number of pixels equivalent to the width of the edge area, as described later, the width of the edge area needs to be represented in pixels. For this reason, in this embodiment, the index value SL obtained by multiplying the maximum standard deviation σmax by the resolution RS is used to determine the expansion level.

Figure 8A:
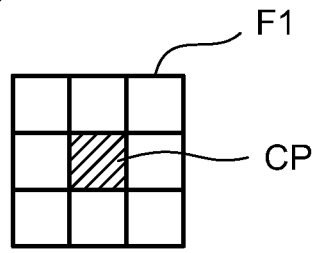
FIGS. 8A to 8C illustrate examples of filters used to extend a text area.
Figure 8B:
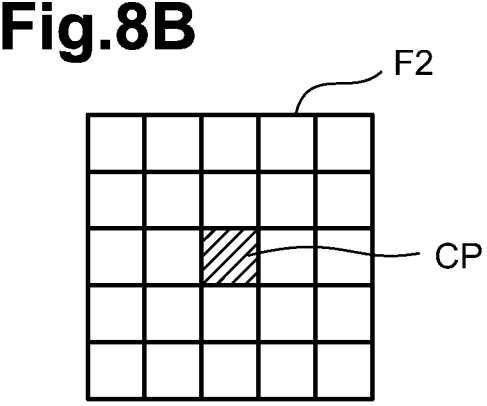
Figure 8C:
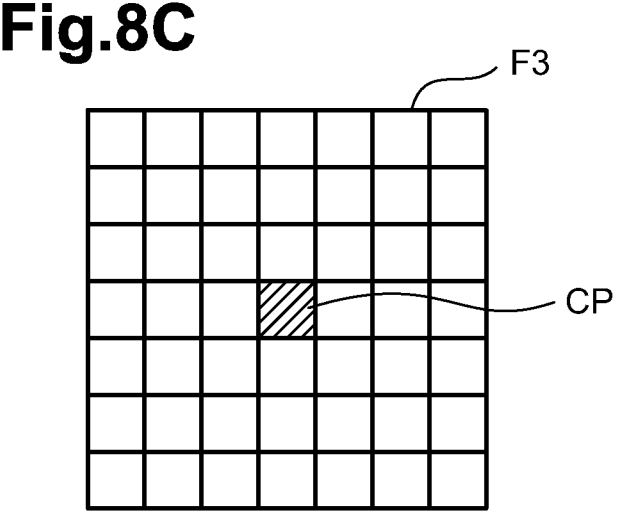

In step S325, the surrounding area determining unit 133 determines a filter used to extend the text area, according to the expansion level. FIGS. 8A to 8C illustrate examples of filters used to extend the text area. When the expansion level is 0, no filter is set, in which case text area extension described later is not executed. When the expansion level is 1, the filter to be used is determined to be a filter F1 (see FIG. 8A) with a size of three vertical pixels by three horizontal pixels. When the expansion level is 2, the filter to be used is determined to be a filter F2 (see FIG. 8B) with a size of five vertical pixels by five horizontal pixels. When the expansion level is 3 or 4, the filter to be used is determined to be a filter F3 (see FIG. 8C) with a size of seven vertical pixels by seven horizontal pixels.

Figure 9A:
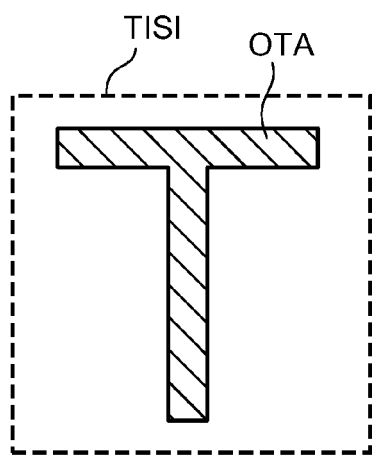
FIGS. 9A to 9D illustrate creation of extended text binary data.
Figure 9B:
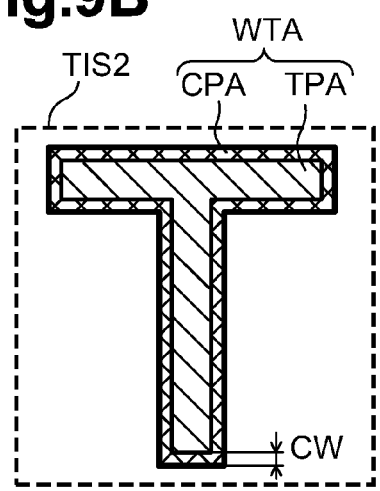

In step S330, the extended text area determining unit 131 applies the determined filter to the text binary data for the target text object area so as to create extended text binary data. FIGS. 9A to 9D illustrate creation of extended text binary data. FIG. 9A illustrates a binary image TIS1 represented by text binary data to which the filer has not been applied yet. FIG. 9B illustrates a binary image TIS2 represented by text binary data to which the filter has been applied (that is, represented by extended text binary data). The hatched area in FIG. 9A is a text area OTA corresponding to the text pixels constituting text, each of which has a pixel value of "1". The area other than the text area OTA is a non-text area corresponding to non-text pixels not constituting text, each of which has a pixel value of "0". The extended text area determining unit 131 sequentially selects one of a plurality of pixels constituting the text binary image TIS1, which is represented by the text binary data, as a noted pixel. The extended text area determining unit 131 determines whether, when the filter is overlap on the text binary image TIS1 such that the central pixel CP of the filter are placed at the noted pixel, there is one or more text pixels with a pixel value of "1" within the entire range of the filter. If there is one or more text pixels within the range of the filter, the extended text area determining unit 131 sets the noted pixel to pixel value of "1". If there are no text pixels within the range of the filter, that is, all pixels in the range of the filter are non-text pixels, the extended text area determining unit 131 sets the noted pixel to pixel value of "0" (that is, the pixel value of the noted pixel remains unchanged).

The text area WTA (i.e. extended text area) in the text binary image TIS2 represented by the text binary data to which the filter has been applied (i.e. extended text binary data) includes an area TPA, which corresponding to the text area OTA to which the filter has not been applied, and a surrounding area CPA around the text area TPA. The width CW of the surrounding area CPA, that is, the size of the surrounding area CPA, is determined by the size of the applied filter. For example, when the filter F1 in FIG. 8A has been applied, the width CW is equivalent to one pixel; when the filter F2 in FIG. 8B has been applied, the width CW is equivalent to two pixels; when the filter F3 in FIG. 8C has been applied, the width CW is equivalent to three pixels.

Figure 9C:
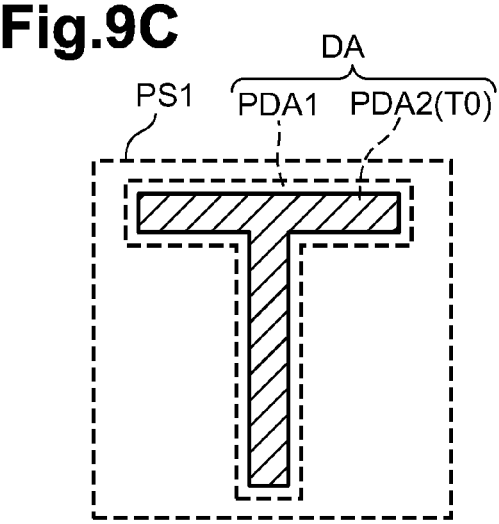

In step S335 of FIG. 4, the changing unit 136 changes the color of the extended text area in the scanned image SI (text object area) using the extended text binary data. FIG. 9C illustrates a partial image PSI, of the scanned image SI, which corresponds to the above extended text binary image TIS2 shown in FIG. 9B. FIG. 9C shows an area DA in the scanned image SI, which corresponds to the extended text area WTA in the extended text binary image TIS2. The area DA is also referred to as an extended text area DA in the scanned image SI. The extended text area DA includes the letter T0 (or text area PDA2) in the scanned image SI and a surrounding area PDA1 around the text area PDA2. First, the changing unit 136 uses the extended text binary data (see FIG. 9B) to identify a plurality of non-text pixels in the scanned image SI (text object area). The changing unit 136 determines an average of the pixel values (color values) of all non-text pixels in the text object area as the background color value. The changing unit 136 identifies the extended text area DA in the scanned image SI, which corresponds to the extended text area WTA in the text binary image TIS2 represented by the extended text binary data (see FIG. 9B). The changing unit 136 changes the pixel values (color values) of all pixels constituting the extended text area DA in the scanned image SI to the background color value. As a result, the letter in the target text object area in the scanned image SI is deleted. That is, background image data representing the background image BI is created.

Figure 9D:
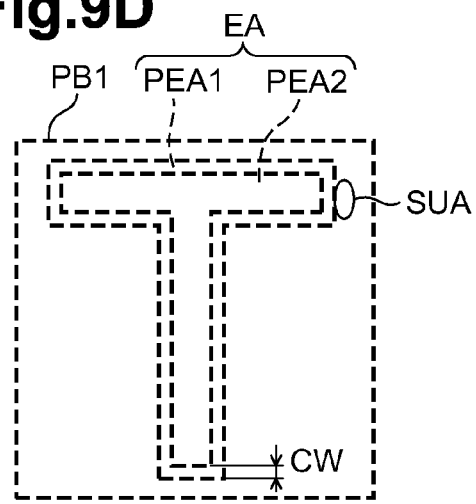

FIG. 9D illustrates an image in which the color of the extended text area DA of the scanned image SI has been changed to the background color, that is, illustrates the partial image PBI of the background image BI. In FIG. 9D, an area EA in which the color of the background image BI has been changed is illustrated. The area EA is also referred to as the extended text area EA in the background image BI. The extended text area EA in the background image BI can be seen to include an area PEA2 corresponding to the letter T0 in the scanned image SI and a surrounding area PEA1 around the area PEA2.

In step S340, the background image creating unit 130 determines whether a correction condition is satisfied. The correction condition is that the degree of a text blur is larger than or equal to a reference value. In this embodiment, the correction conditions is that the expansion level determined in step S320 according to the index value SL is "4". If the correction condition is satisfied (i.e. if YES in step S340), the background image creating unit 130 turns on a correction flag in step S345 and causes the processing to proceed to step S350. If the correction condition is not satisfied (i.e. if NO in step S340), the background image creating unit 130 causes the processing to proceed to step S350 without turning on the correction flag. The correction flag is initially turned off.

In step S350, the background image creating unit 130 determines whether all text object areas have been selected. If all text object areas have not been selected (i.e. if NO in step S350), the background image creating unit 130 returns to step S305 to select another text object area that has not been selected, and repeats processing in step S310 to S345. If all text object areas have been selected (i.e. if YES in step S350), the background image creating unit 130 causes the processing to proceed to step S360.

When the processing has proceeded to step S360, the background image creating unit 130 finally creates background image data that represents the background image BI (see FIG. 3D) in which the text objects, which had been present in the scanned image SI, have been deleted. As illustrated in FIG. 3D, the background image BI can include the photo object Ob3 and drawing object Ob4 together with the background Bg1 but does not include the text objects Ob1 and Ob2.

In step S360, the background image creating unit 130 determines whether the correction flag is turned on. If the correction flag is not turned on (i.e. if NO in step S360), the background image creating unit 130 terminates the background image data creation processing. If the correction flag is turned on (i.e. if YES in step S360), the correcting unit 137 executes color count reduction correction on the background image data (step S365). Specifically, the correcting unit 137 corrects the pixel value (RGB value) of each pixel data included in the background image data by using equation (5) below.

$$Vb = K \times \text{ROUND}(Va/K) \qquad (5)$$

In equation (5), Va is the pixel value before correction is executed, Vb is the pixel value after correction has been executed, and K is a color count reduction coefficient. The larger the value of K is, the smaller the number of colors is. In this embodiment, K is 4. ROUND (argument) is a function that rounds off the argument at the first decimal place to make the argument to be an integer. This color count correction changes each consecutive K tone values to one tone value, reducing the number of colors (i.e. the number of types of tone values) included in the background image data. When color count reduction correction has been executed, the background image creating unit 130 terminates the background image data creation processing.

According to this embodiment described above, when the background image data is created, the color of the extended text area DA (see FIG. 9C), which includes the text area PDA2 and the surrounding area PDA1 around the text area PDA2 in the text object areas (TA1 and TA2 in FIG. 3A) in the scanned image SI, is changed to a background color. The size of the surrounding area PDA1 in the scanned image SI (i.e. the size of the surrounding area PEA1 in the background image BI) is determined according to the feature value related to the sharpness of the text, specifically, according to the index value SL that indicates the degree of a text blur. As a result, since the extended text area determining unit 131 can appropriately determine the extended text area DA according to the sharpness of the text (or the degree of a text blur), it is possible to suppress the lowering of the appearance of text in a reproduced image obtained by reproducing the scanned image SI using a highly compressed PDF file. When the color of the surrounding area PDA1 in the scanned image SI is not changed to the background color during background image data creation, blurred character edges (BL1 in FIG. 6B and BL2 in FIG. 6C) may be left in the surrounding area PEA1 (see FIG. 9D) in the background image BI depending on the degree of a text blur. This may cause blurred edges in the vicinity of edges of the text image, which was clearly reproduced by using text binary data, in the reproduced mage obtained from the background image data and text binary data. Accordingly, the appearance of the text in the reproduced image may be lowered. In this embodiment, since the color of the surrounding area PDA1 around the text area PDA2 in the scanned image SI is changed to the background color, the possibility of blurred character edges being left in the background image BI can be lowered.

If the background image BI has unevenness in, for example, the background of the text object area, an edge that has not been included in the original scanned image SI may appear along a boundary SUA (see FIG. 9D) between the surrounding area PEA1, the color of which has been changed to the background color, and the background image BI. As the size of the surrounding area PEA1 (i.e. width CW in FIG. 9D) becomes larger, this type of edge is likely to be more noticeable (an edge of the character appears to be a double line). Accordingly, the size of the surrounding area PEA1 is preferably minimized within a range in which blurred character edges are not left. Since the extended text area determining unit 131 in this embodiment can determine the surrounding area PEA1 having an appropriate size according to the degree of a text blur, the lowering of the appearance of the text in the reproduced image can be further suppressed.

If the surrounding area PEA1 in the background image BI includes blurred character edges, the evenness of the background image BI is lowered and frequency components of the background image BI are thereby increased. As a result, if the background image data representing the background image BI is compressed in the JPEG method, the compression ratio may be lowered. This embodiment can reduce the possibility of blurred character edges being left in the background image BI and can improve the compression ratio of the background image data.

The calculating unit 134 in this embodiment calculates the standard deviation σ, which represents the distribution of text color in the text object area for each of the three color components, as the feature value related to the degree of text blur. The surrounding area determining unit 133 determines the size of the surrounding area CPA in the text binary image TIS (i.e. the size of surrounding area PEA1 in the background image BI) according to the maximum standard deviation σmax of the three standard deviations σ. This enables the surrounding area PEA1 having an appropriate size to be determined. As seen from the above descriptions, the maximum standard deviation σmax is an example of the feature value related to the sharpness of text, or an example of the feature value related to the degree of text blur.

When the size of the surrounding area PEA1 in the background image BI is too large, an edge that has not been included in the original scanned image SI may become noticeable in the reproduced image along, for example, the boundary SUA in FIG. 9D. To solve this problem, in this embodiment, an upper limit (size corresponding to the filer F3 in FIG. 8C) is provided for the size of the surrounding area PEA1. If the index value SL representing the degree of text blur is larger than the threshold TH4, that is, the expansion level is determined to be 4, the size of the surrounding area PEA1 is determined to be the upper limit and color count reduction correction (see step S365 of FIG. 4) is executed on the background image data. After color count reduction correction is executed, a difference between the color of the surrounding area PEA1 in the background image BI and the color of an area around the surrounding area PEA1 becomes smaller than before the color count reduction correction is executed. As a result, even if a blurred character edge is left outside the surrounding area PEA1 in the background image BI, the edge can be made unnoticeable. This further suppresses the lowering of the appearance of the text in the reproduced image. Even if a blurred character edge is left outside the surrounding area PEA1 in the background image BI, the color count reduction correction can improve the evenness of the edge, and thus the compression ratio of the background image data can be improved.

B. Second Embodiment (B-1. Structure of Computer 200) The extended text area determining unit 131 in the second embodiment determines the size of the surrounding area PEA1 according to the color of the text in the text object area. Specifically, the extended text area determining unit 131 in the second embodiment comprises a text color identifying unit 135, which is indicated in a dashed box in FIG. 1. The external storage unit 290 in the computer 200 in the second embodiment stores characteristic data 293.

Figures 10A, 10B:
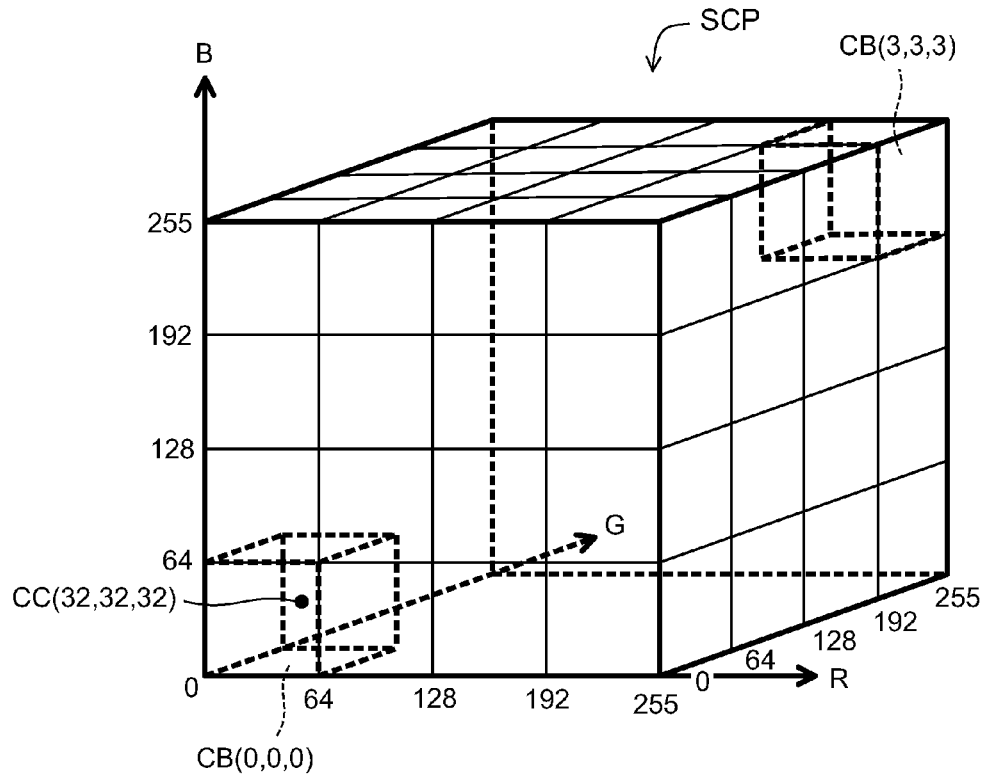
FIGS. 10A and 10B illustrate characteristic data.

FIGS. 10A and 10B illustrate the characteristic data 293. FIG. 10A is an example of the characteristic data 293 and FIG. 10B indicates a RGB color space SCP in which color blocks are defined. The characteristic data 293 is stored in the form of a table in which text colors and the standard deviations σ described above, each of which represents the degree of text blur, are mutually associated. Specifically, in the characteristic data 293, color values that can be taken by text colors are divided into a plurality of color blocks CB, and each color block CB is associated with a standard deviation σ (see FIG. 10A). Each pixel value of the scanned data indicates a color by the use of coordinates in the RGB color space SCP illustrated in FIG. 10B. The plurality of color blocks CB are blocks obtained by equally dividing a color gamut, which is represented as a cube when the RGB color space SCP is indicated in a three-dimensional orthogonal coordinate system, into, for example, 64 (4 by 4 by 4) segments. In this example, the tone values of each of the three color components are divided into four groups, that is, group 0 (0 to 63), group 1 (64 to 127), group 2 (128 to 191), and group 3 (192 to 255), and each color block CB is represented by using these group numbers 0 to 3. For example, a color block including the origin (i.e. black (0, 0, 0)), which is a block the R value of which falls into the range of 0 to 64, the G value of which falls into the range of 0 to 64, and the B value of which falls into the range of 0 to 64, is represented as a color block CB (0, 0, 0) (see FIG. 10B). Similarly, a color block including white (255, 255, 255) is represented as a color block CB (3, 3, 3) (see FIG. 10B).

(B-2. Background Image Data Creation Processing) Background image data creation processing in the second embodiment will be described with reference to FIG. 4. The background image data creation processing in the second embodiment is the same as the background image data creation processing in the first embodiment except that steps S315B, S320B, and S322B indicated in the dashed boxes in FIG. 4 are executed instead of steps S315 and S320 in the background image data creation processing in the first embodiment.

In step S315B, the text color identifying unit 135 identifies the text color value (RGB value) of the text object area selected for processing. Specifically, in the text object area selected for processing, the text color identifying unit 135 identifies a text area corresponding to a plurality of text pixels constituting text in the text binary data. The text image creating unit 120 identifies the average of the pixel values (color values) in the text area as the text color value.

In step S320B, the information acquiring unit 132 acquires the standard deviation from the characteristic data 293 according to the text color value. Specifically, the information acquiring unit 132 identifies the color block CB (see FIG. 10B) to which the text color value belongs, and acquires the standard deviation σ associated with the identified color block CB from the characteristic data 293.

In step S322B, the extended text area determining unit 131 determines an expansion level from the standard deviation σ acquired from the characteristic data 293 and the resolution RS of the scanned data. Specifically, the extended text area determining unit 131 obtains the index value SL by multiplying the standard deviation σ by the resolution RS (SL=σ×RS), and determines an expansion level according to the obtained index value SL (see FIG. 6A).

(B-3. Method of Creating Characteristic Data 293) The method of creating characteristic data 293 will be described. Characteristic data 293 is created by, for example, a provider of the scanner driver 100 (such as the manufacturer of the scanner 300) by using a creating apparatus. The creating apparatus is, for example, a computer, such as a personal computer, that is connected to the scanner 300. FIG. 11 is a flowchart of characteristic data creation processing executed to create the characteristic data 293.

Figure 12:
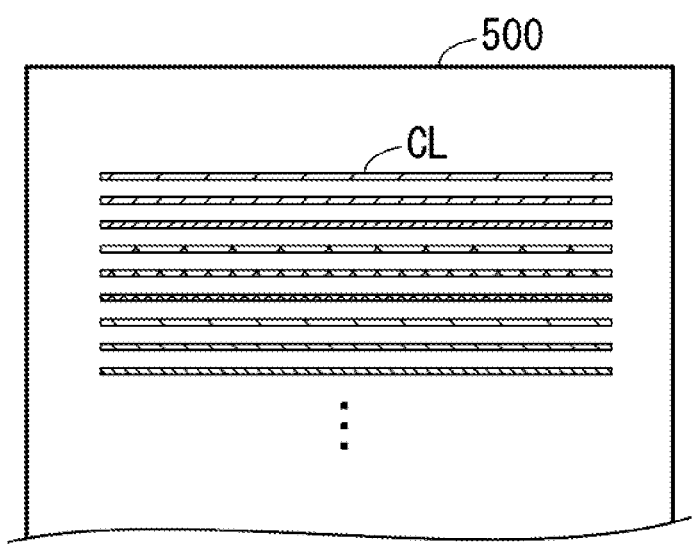
FIG. 12 illustrates an example of a standard document.

In step S610, the creating apparatus controls the scanner 300 and reads a standard document 500 so as to create standard scanned data. FIG. 12 illustrates an example of the standard document 500. On the standard document 500, 64 color lines CL have been printed in correspondence to the 64 (4 by 4 by 4) color blocks CB described above. Each color line CL has been printed in a central color of the corresponding color block CB. The central color of the color block CB is represented by, for example, the color value at the center of that color block CB in the RGB color space SCP. For example, as illustrated in FIG. 10B, the central color of the color block CB(0, 0, 0) is the color represented by CC(32, 32, 32) at the center of the color block CB(0, 0, 0). The color line CL is about as thick as, for example, ordinary lines constituting text.

In step S620, the creating apparatus uses the standard scanned data so as to calculate a standard deviation a of a histogram of each color line CL. Specifically, the creating apparatus identifies a line area including one color line CL selected for processing, the line area being located in the scanned image (i.e. standard scanned image) represented by the standard scanned data, and calculates the histogram of the line area. The histogram of the line area is similar to the histogram of the text object area illustrated in FIG. 5; the histogram of the line area has a peak corresponding to the color line CL and a peak corresponding to the background. For each of the 64 color lines CL, the creating apparatus calculates the standard deviation σ of a histogram within a predetermined range centered at the peak corresponding to the color line CL, calculating a total of 64 standard deviations σ.

In step S630, the creating apparatus creates characteristic data 293 in which combinations of 64 color blocks CB and 64 standard deviations σ are included. Specifically, when creating characteristic data 293, the creating apparatus associates, for each color line CL, the color block CB corresponding to the color line CL with the standard deviation corresponding to the color line CL.

In the second embodiment described above, since the surrounding area determining unit 133 determines the size of the surrounding area PEA1 in the background image BI according to the text color value, an appropriate extended text area can be determined. The degree of text blur may differ depending on the color of text in the text object area, so the text color value can be said to be related information about the degree of text blur and about the sharpness of text.

The computer 200 in the second embodiment stores the characteristic data 293 in the external storage unit 290. The degree of text blur may vary depending on the characteristics specific to the image reading apparatus (the scanner 300, for example). The characteristic data 293 has been created based on the standard scanned data created by using the scanner 300. That is, the standard deviation σ included in the characteristic data 293 is a setting that depends on the characteristics of the scanner 300, which is a type of image reading apparatus. In the above embodiment, the size of the surrounding area PEA1 is determined according to the standard deviation σ that depends on the characteristics of the scanner 300, so an appropriate extended text area can be determined. Different values may be set in the characteristic data 293 for different models of the scanner 300. Alternatively, different values may be set for different scanners 300 of the same model.

C. Modifications (Modification 1) The characteristic data 293 in the second embodiment includes the plurality of standard deviations σ associated with the plurality of color blocks CB, as a value representing the degree of text blur that depends on the apparatus characteristics of the scanner 300. Alternatively, only one standard deviation σ may be included for each scanner. In this case, step S640 indicated in the dashed box in FIG. 11 is added to the characteristic data creation processing described above. In step S640, the creating apparatus calculates the average nave of the plurality of standard deviations σ calculated for the plurality of color lines CL. The calculated average σave is included in the characteristic data 293. In this case, a single average (save is obtained regardless of the text color value, without the text color value being identified in steps S315B and S320B in the background image data creation processing in FIG. 4.

(Modification 2) The color count reduction correction in step S365 of FIG. 4 in the above embodiment does not need to be executed for the entire background image BI; the color count reduction correction may be executed for part of the background image BI. For example, the correcting unit 137 may execute the color count reduction correction for an area in the background image BI in FIG. 3D in which the areas of the photo object Ob3 and drawing object Ob4 have been excluded. In general, the color count reduction correction is preferably executed for an area that includes at least part of the extended text area EA in the background image BI and at least part of the area around the extended text area EA, such that the difference between the color of the extended text area EA and the color of the area around the extended text area EA becomes smaller than before the color count reduction correction is executed.

(Modification 3) The color count reduction correction described herein is only an example; any of other various corrections may be used. The correcting unit 137 may adopt correction in which an average filter is used, correction in which a median filter is used, whiting correction, or the like instead of the color count reduction correction. In the correction in which an average filter is used, the pixel value (RGB value) of the pixel at the center of a filter having a predetermined size, for example three vertical pixels by three horizontal pixels, is changed to the average of a plurality of pixel values in the filter range. In correction in which a median filer is used, the pixel value of the pixel at the center of a filter with a predetermined size is changed to the median value of a plurality of pixel values in the filter range. In whiting correction, colors in a prescribed range that are close to white are changed to white. In whiting correction for an image formed with RGB pixel data, for example, the correcting unit 137 multiplies a pixel value before correction by a prescribed coefficient not smaller than 1 (1.1, for example) and sets the result of the multiplication as a pixel value after correction has been executed. If the multiplication result exceeds the maximum value (255), the correcting unit 137 sets the maximum value as the pixel value taken after the correction. Whiting correction is preferably executed when the background color of the text object area in the background image BI is white or a color close to white. In general, the correcting unit 137 preferably corrects the color of the background image BI such that the difference between the color of the extended text area EA in the background image BI and the color of the area around the extended text area EA becomes smaller than before the correction is executed.

(Modification 4) In the first embodiment, the standard deviation σ calculated by using the histogram of the text object area has been used as related information related to the degree of text blur. The related information may be said to be related information about the sharpness of text. In the second embodiment, the text color value and the standard deviation included in the characteristic data 293 have been used as the related information. Instead, the related information may be another statistic having a correlation to the spread of a peak in the histogram of the text object image such as, for example, a ratio between the number of text pixels constituting text and the height of the peak. Alternatively, the related information may be the characteristics of the image reading apparatus (such as the scanner 300) that has been used to create scanned data, for example, apparatus characteristics including characteristics of optical sensors (such as charge-coupled devices (CCDs)) and an optical source; particularly the related information may be information representing apparatus characteristics having a correlation to the degree of text blur.

(Modification 5) In the above embodiments, the image processing functions of the scanner driver 100 included in the computer 200 may be provided in the scanner 300, a machine having an image reading unit such as a multi-function machine, or an apparatus having an optical unit that creates image data such as a digital camera. The multi-function machine or scanner 300 that has the image processing function may perform image processing on scanned data created by using the image reading unit of the multi-function machine or scanner 300 so as to create processed image data (highly compressed PDF file, for example) and may output the processed image data to a computer, such as a personal computer, connected so that communication is possible.

In general, the apparatus that implements the image processing functions of the scanner driver 100 is not limited to the computer 200; these functions may be implemented be a multi-function machine, a digital camera, a scanner, or the like. The image processing functions may be implemented by a single apparatus or by a plurality of apparatuses connected through a network. In this case, a system having the plurality of apparatuses that implement the image processing functions is corresponding to an image processing apparatus.

(Modification 6) In the above embodiments, part of the structure that has been implemented by hardware may be replaced with software. Conversely, part of the structure that has been implemented by software may be replaced with hardware.

While the invention has been described in connection with the above embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. An image processing apparatus comprising:
    a controller configured to:
    create text image data representing a text image, based on target image data representing a target image including text;
    determine an extended text area in the target image based on information related to a sharpness of the text included in the target image, the extended text area including a text area corresponding to pixels constituting text in the text image represented by the created text image data, and also including a surrounding area around the text area; and
    change a color of the extended text area to a color of a background of the target image to create background image data.

2. The image processing apparatus according to claim 1, wherein the controller is further configured to determine a size of the surrounding area based on the information to determine the extended text area.

3. The image processing apparatus according to claim 1, wherein the controller is further configured to:
    calculate a feature value related to the sharpness of the text included in the target image; and
    determine a size of the surrounding area based on the calculated feature value to determine the extended text area.

4. The image processing apparatus according to claim 3, wherein the feature value comprises a standard deviation of a color of the text in the target image.

5. The image processing apparatus according to claim 4, wherein the feature value further comprises a resolution of the target image data.

6. The image processing apparatus according to claim 3, wherein the controller is further configured to multiply a standard deviation of a color of the text in the target image by a resolution of the target image data to calculate the feature value.

7. The image processing apparatus according to claim 1, wherein the controller is further configured to:
    identify a text color value representing a color of the text included in the target image; and
    determine a size of the surrounding area based on the identified text color value to determine the extended text area.

8. The image processing apparatus according to claim 7, wherein the controller is further configured to:
    determine, with reference a table, a standard deviation associated with the identified text color value; and
    determine the size of the surrounding area based on the determined standard deviation.

9. The image processing apparatus according to claim 2, wherein the controller is further configured to:
    set the size of the surrounding area to an upper limit when the information satisfies a predetermined condition; and
    execute correction processing on the background image data when the information satisfies the predetermined condition, the correction processing making a difference between the changed color of the extended text area and a color of an area adjacent to the extended text area smaller than before the correction processing is executed.

10. The image processing apparatus according to claim 1, wherein the target image data is to be created by an image reading unit configured to optically read out a document, and
wherein the information related to the sharpness of the text comprising a value depending on characteristics of the image reading unit.

11. The image processing apparatus according to claim 2, wherein the controller is further configured to determine the size of the surrounding area where the less sharp the information indicates, the larger the size of the surrounding area is.

12. A non-transitory computer-readable storage medium storing computer-readable instructions that, when executed, cause a processor to perform:
creating text image data representing a text image, based on target image data representing a target image including text;
determining an extended text area in the target image based on information related to a sharpness of the text included in the target image, the extended text area including a text area corresponding to pixels constituting text in the text image represented by the created text image data, and also including a surrounding area around the text area; and
changing a color of the extended text area to a color of a background of the target image to create background image data.

13. The non-transitory computer-readable storage medium according to claim 12, wherein the determining of the extended text area comprises:
determining a size of the surrounding area based on the information.

14. The non-transitory computer-readable storage medium according to claim 12, wherein the determining of the extended text area comprises:
calculating a feature value related to the sharpness of the text included in the target image; and
determining a size of the surrounding area based on the calculated feature value.

15. The non-transitory computer-readable storage medium according to claim 14, wherein the feature value comprises a standard deviation of a color of the text in the target image.

16. The non-transitory computer-readable storage medium according to claim 15, wherein the feature value further comprises a resolution of the target image data.

17. The non-transitory computer-readable storage medium according to claim 14, wherein the calculating of the feature value comprises:
multiplying a standard deviation of a color of the text in the target image by a resolution of the target image data.

18. The non-transitory computer-readable storage medium according to claim 12, wherein the determining of the extended text area comprises:
identifying a text color value representing a color of the text included in the target image; and
determining a size of the surrounding area based on the identified text color value.

19. The non-transitory computer-readable storage medium according to claim 18, wherein the determining the size of the surrounding area comprises:
determining, with reference a table, a standard deviation associated with the identified text color value; and
determining the size of the surrounding area based on the determined standard deviation.

20. The non-transitory computer-readable storage medium according to claim 13, wherein the determining of the size of the surrounding area comprises:
setting the size of the surrounding area to an upper limit when the information satisfies a predetermined condition,
and wherein the computer-readable instructions that, when executed, cause the processor to further perform:
executing correction processing on the background image data when the information satisfies the predetermined condition, the correction processing making a difference between the changed color of the extended text area and a color of an area adjacent to the extended text area smaller than before the correction processing is executed.

21. The non-transitory computer-readable storage medium according to claim 12, wherein the target image data is to be created by an image reading unit configured to optically read out a document, and
wherein the information related to the sharpness of the text comprising a value depending on characteristics of the image reading unit.

22. The non-transitory computer-readable storage medium according to claim 13, wherein the determining of the size of the surrounding area is performed where the less sharp the information indicates, the larger the size of the surrounding area is.

23. A method comprising:
creating text image data representing a text image, based on target image data representing a target image including text;
determining an extended text area in the target image based on information related to a sharpness of the text included in the target image, the extended text area including a text area corresponding to pixels constituting text in the text image represented by the created text image data, and also including a surrounding area around the text area; and
changing a color of the extended text area to a color of a background of the target image to create background image data.

* * * * *